US012063726B2

(12) United States Patent
Foecking et al.

(10) Patent No.: US 12,063,726 B2
(45) Date of Patent: Aug. 13, 2024

(54) LIGHTING UNIT, IN PARTICULAR HEADLIGHT, COMPRISING A LIGHT-EMITTING DIODE MATRIX AND A CONTROLLED POWER SOURCE

(71) Applicant: HELLA GmbH & Co. KGaA, Lippstadt (DE)

(72) Inventors: Christoph Foecking, Lippstadt (DE); Dieter Nietfeld, Paderborn (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 113 days.

(21) Appl. No.: 17/875,516

(22) Filed: Jul. 28, 2022

(65) Prior Publication Data

US 2022/0377862 A1 Nov. 24, 2022

Related U.S. Application Data

(63) Continuation of application No. PCT/EP2021/050775, filed on Jan. 15, 2021.

(30) Foreign Application Priority Data

Jan. 29, 2020 (DE) ..................... 10 2020 102 074.0

(51) Int. Cl.
*H05B 45/44* (2020.01)

(52) U.S. Cl.
CPC .................................... *H05B 45/44* (2020.01)

(58) Field of Classification Search
CPC ........ H05B 45/44; H05B 45/46; H05B 45/10; H05B 47/10; H05B 45/48; H05B 45/52;
(Continued)

(56) References Cited

U.S. PATENT DOCUMENTS 6,628,355 B1 * 9/2003 Takahara ............. H04N 9/3167 349/86
7,800,316 B2 * 9/2010 Haug ..................... H05B 45/48 315/391

(Continued)

FOREIGN PATENT DOCUMENTS

DE 102010060857 A1 5/2012
DE 102012101363 A1 8/2013

(Continued)

OTHER PUBLICATIONS

International Search Report dated Mar. 12, 2021 in corresponding application PCT/EP2021/050775.

*Primary Examiner* — Monica C King
(74) *Attorney, Agent, or Firm* — Muncy, Geissler, Olds & Lowe, P.C.

(57) ABSTRACT

A lighting unit having a light-emitting diode matrix and a controllable power source, in particular for a headlight. The light-emitting diode matrix is equipped with at least one first supply connection, a number m of first switches which have a first connection that is connected to the first supply connection, at least one second supply connection, a number n of second switches which have a second connection that is connected to the second supply connection, a number of m*n inorganic light-emitting diodes, a first connection of which is connected to a second connection of one of the first switches and a second connection of which is connected to a first connection of one of the second switches.

10 Claims, 1 Drawing Sheet

(58) Field of Classification Search

CPC ............. G09G 3/32; G09G 2300/0866; G09G 3/3233; G09G 2300/0861; G09G 3/3266; G09G 3/3208; G09G 3/3225; B60Q 1/1415; B60Q 1/2696; F21S 41/663; F21S 41/151; H10K 59/1213; H10K 50/82; F21K 9/00

See application file for complete search history.

(56) References Cited

U.S. PATENT DOCUMENTS

| | | | | |
|---|---|---|---|---|
| 8,174,212 | B2 * | 5/2012 | Tziony | H05B 45/10 315/306 |
| 8,471,495 | B2 * | 6/2013 | Muguruma | H05B 45/44 315/210 |
| 8,598,776 | B2 * | 12/2013 | Bogner | B60Q 1/0088 313/500 |
| 8,680,782 | B2 * | 3/2014 | Sakuragi | H05B 45/48 315/307 |
| 9,095,021 | B2 * | 7/2015 | Seider | H05B 45/395 |
| 9,179,512 | B2 * | 11/2015 | Ni | H05B 45/48 |
| 9,295,118 | B2 | 3/2016 | Nietfeld | |
| 9,445,471 | B2 * | 9/2016 | Xu | H05B 45/44 |
| 9,510,413 | B2 * | 11/2016 | Athalye | H05B 45/48 |
| 9,538,591 | B2 * | 1/2017 | Kim | H05B 45/46 |
| 9,750,099 | B2 * | 8/2017 | Chen | H05B 45/48 |
| 9,845,939 | B2 * | 12/2017 | Kim | F21V 23/06 |
| 2005/0242747 | A1 * | 11/2005 | Kato | G09G 3/3225 315/169.3 |
| 2012/0212354 | A1 | 8/2012 | Broga et al. | |
| 2013/0328753 | A1 * | 12/2013 | Tsuge | G09G 3/3233 345/77 |
| 2015/0022112 | A1 * | 1/2015 | Nietfeld | H05B 45/46 315/210 |
| 2017/0150078 | A1 * | 5/2017 | Ukai | H04N 25/57 |
| 2017/0162114 | A1 * | 6/2017 | Ono | G09G 3/3233 |
| 2018/0151125 | A1 * | 5/2018 | Lee | G09G 3/3266 |
| 2018/0359825 | A1 | 12/2018 | Hussel | |
| 2019/0086065 | A1 * | 3/2019 | Hirose | H05B 45/38 |
| 2019/0181206 | A1 * | 6/2019 | Cao | G06F 3/0412 |
| 2019/0340972 | A1 * | 11/2019 | Hao | G09G 3/2088 |
| 2020/0022231 | A1 * | 1/2020 | Nietfeld | H05B 45/00 |
| 2020/0077478 | A1 * | 3/2020 | Kondo | H01L 29/74 |
| 2020/0089038 | A1 * | 3/2020 | Yoshino | G06F 3/0445 |
| 2021/0233968 | A1 * | 7/2021 | Yang | H10K 59/353 |
| 2022/0377862 | A1 * | 11/2022 | Foecking | H05B 45/10 |
| 2023/0354489 | A1 * | 11/2023 | Nemati | H05B 45/50 |

FOREIGN PATENT DOCUMENTS

| | | | |
|---|---|---|---|
| JP | H02212884 | A | 8/1990 |
| WO | WO2010034276 | A1 | 4/2010 |

* cited by examiner

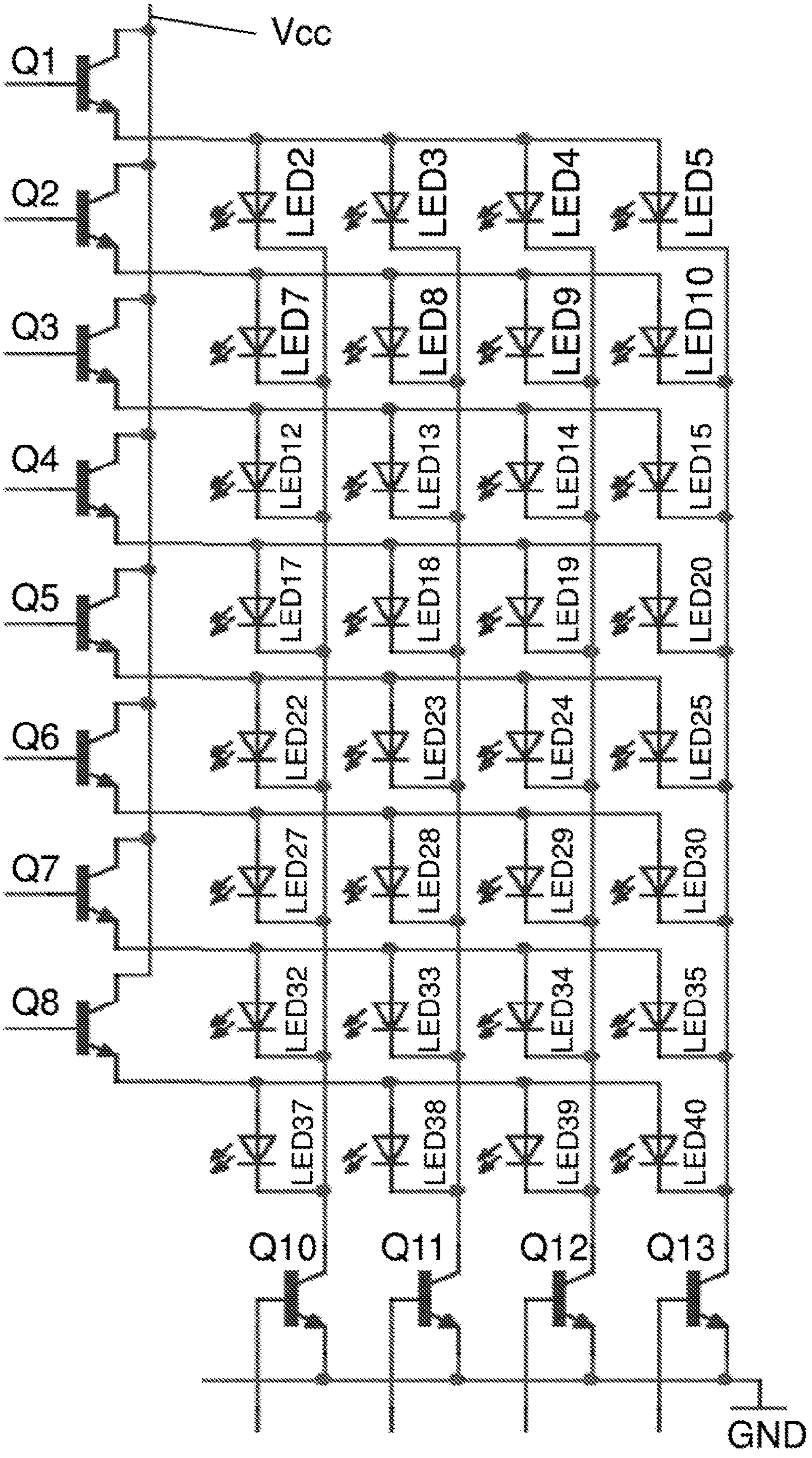
Vcc
Q1
Q2
Q3
Q4
Q5
Q6
Q7
Q8
LED2
LED3
LED4
LED5
LED7
LED8
LED9
LED10
LED12
LED13
LED14
LED15
LED17
LED18
LED19
LED20
LED22
LED23
LED24
LED25
LED27
LED28
LED29
LED30
LED32
LED33
LED34
LED35
LED37
LED38
LED39
LED40
Q10
Q11
Q12
Q13
GND

LIGHTING UNIT, IN PARTICULAR HEADLIGHT, COMPRISING A LIGHT-EMITTING DIODE MATRIX AND A CONTROLLED POWER SOURCE

This nonprovisional application is a continuation of International Application No. PCT/EP2021/050775, which was filed on Jan. 15, 2021, and which claims priority to German Patent Application No. 10 2020 102 074.0, which was filed in Germany on Jan. 29, 2020, and which are both herein incorporated by reference.

BACKGROUND OF THE INVENTION

Field of the Invention

The present invention relates to a lighting unit, in particular a headlight, comprising a light-emitting diode matrix and a controlled power source.

Description of the Background Art

From publications DE 10 2010 060 857 A1 and DE 10 2012 101 363 A1, which corresponds to U.S. 2015/0022112, which is incorporated herein by reference, circuits made of inorganic light-emitting diodes are known, which are used in motor vehicle headlights. The circuits include series circuits of inorganic light-emitting diodes and controlled switches, wherein the series connections are connected in parallel. With the switch, power can be interrupted by the series connection. To supply the LEDs, a controlled power source is used, which is supplied with power with the parallel connection. The parallel connection is therefore connected, on the one hand, to the power source and on the other hand, at least indirectly to a ground potential. By closing the switches, the LEDs can be switched on. It is possible to switch each LED on and off individually. The current that flows through the switched on LED can also be individually adjusted by means of the controlled power source.

It is possible to modify the circuits known from publications DE 10 2010 060 857 A1 and DE 10 2012 101 363 A1 in such a way that the series connections are not connected in parallel and connected to a power source. It is possible to provide a power source in each series connection. This can be provided on the cathode side or on the anode side of the light-emitting diodes. If the power source is provided on the anode side, the series connections on the cathode side are connected to each other. This is referred to as a common cathode circuit. If the power source is provided on the cathode side, the series connections on the anode side are connected to each other. This is referred to as a common anode circuit. The common connection of the series connections is not switched. With such a circuit, the power for each LED can be individually adjusted, even if several LEDs are switched on at the same time.

In the future, headlights, in particular automotive headlights with several hundred inorganic light-emitting diodes, will be realized in a matrix arrangement.

In the circuits known from the prior art, the large number of LEDs leads to an equally large number of switches and possibly also controlled sources.

SUMMARY OF THE INVENTION

It is therefore an object of the present invention to provide a circuit with several hundred inorganic LEDs, which makes it possible to individually control the LEDs without an equally large number of switches and possibly controlled sources.

This object is achieved by a lighting unit, in particular, a headlight comprising a light-emitting diode matrix with at least one first supply connection, a number m of first switches which have a first connection that is connected to the first supply connection, at least one second supply connection, a number n of second switches which have a second connection that is connected to the second supply connection, a number of m*n inorganic light-emitting diodes, wherein a first connection of which is connected to a second connection of one of the first switches and a second connection of which is connected to a first connection of one of the second switches, and wherein each second connection of a first switch is connected to a number n of the light-emitting diodes, wherein each first connection of a second switch is connected to a number m of the light-emitting diodes, wherein the light-emitting diodes which are connected to the second connection of the same first switch via the respective first connection of said light-emitting diodes are connected to the first connections of different switches of the second switches via the respective second connections of said light-emitting diodes, and wherein the light-emitting diodes which are connected to the first connection of the same second switch via the respective second connection of said light-emitting diodes are connected to the second connections of different switches of the first switches via the respective first connections of said light-emitting diode and wherein the controllable power source is connected to the first supply connection and the second supply connection.

The light-emitting diodes of the lighting unit matrix can be individually switched on and off by one of the first and one of the second switches. This makes it possible to supply the LED with an individual current from the controlled power source. However, it is not possible to individually supply power to multiple LEDs at the same time from the controlled source. However, by switching on the LEDs sequentially within successive periods, it is possible to supply the LEDs with an individual current, so that the LEDs can produce light with different brightness. The periods are divided into sections in which none or only one LED or more LEDs connected to one of the second switches are operated.

Among other things, a matrix of organic light-emitting diodes is known from publication EP 1 469 450 A1, which corresponds to U.S. 2004/0207315, which is incorporated herein by reference, which can be used in displays. The organic light-emitting diodes of this matrix are arranged like the inorganic light-emitting diodes of the matrix of the invention. The organic light-emitting diodes (OLEDs) are not the same. OLEDs in each of the three basic colors are connected to the first switches with their first connections. Together these form a pixel. By individually controlling the individual OLED of a pixel by means of the first and second switches to which the OLEDs are connected, it is possible to mix the light of the OLED of a pixel in such a way that basically any color can be adjusted. Therefore, the light-emitting diode matrix of organic light-emitting diodes disclosed in publication EP 1 469 450 A1 is particularly suitable for displays and is also used in such displays.

In a light-emitting diode matrix of a lighting unit according to the invention on the other hand, inorganic light-emitting diodes which produce light of the same color are preferably used, since the generation of light, the color of which can be changed, does not arrive when used in a motor vehicle headlight, in particular. Preferably, identical light-emitting diodes are used in a light-emitting diode matrix of a lighting unit according to the invention.

The first connection of the light-emitting diodes can be the anode and the second connection of the light-emitting diode can be the cathode. A reverse connection is also possible. Then, the first connection of the light-emitting diodes is the cathode and the second connection of the light-emitting diode is the anode. Depending on whether the anode or the cathode of the light-emitting diodes are connected to a ground potential via the second switches, there is a so-called common anode circuit or a common cathode circuit.

The lighting unit according to the invention may be a headlight, in particular a motor vehicle headlight.

A lighting unit according to the invention may have a controller with which the first switches and the second switches of the light-emitting diode matrix are controllable. With such a controller it is possible to control the switches in such a way that in each case one of the first switches and none or at least one of the second switches is closed during one of m*n consecutive sections of a period. By means of the light-emitting diodes connected to the closed first switch and the closed second switch, a current can flow to produce light with this LED. During a period, a current can flow through each light-emitting diode during m*n sections of the period, which stimulates the light-emitting diode to glow.

The controller can be set up such that the sections of the period are of different lengths. In this way, it can be achieved that a different amount of light is generated by the light-emitting diodes per period. The different amounts of light are likely to be perceived by the human eye as differences in brightness. It is possible that the controller can be used to change the length of the sections from period to period.

However, it is also possible that the sections of the period are the same length. The brightness of the LEDs can then be varied by means of a current set individually for each section with controllable power sources. For this purpose, the controller can be connected to a control connection of the controllable power source. The controller may be set up in such a way that the current supplied by the power source is adjustable for each section of the period. It is also possible that a PWM is provided to adjust the brightness of the light-emitting diodes.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawing which is given by way of illustration only, and thus, is not limitive of the present invention, and wherein the sole FIGURE illustrates an example embodiment, showing a cross-sectional view of an adjustment fitting with sealing of the eccentric receiving space.

DETAILED DESCRIPTION

The FIGURE shows a circuit diagram of a light-emitting diode matrix of a lighting unit according to the invention.

The light-emitting diode matrix shown in the FIGURE is provided for a motor vehicle headlight. The matrix has a first supply connection Vcc and a second supply connection GND, via which the light-emitting diode matrix can be connected to a controllable power source. The example has 32 inorganic light-emitting diodes LED2 to LED5, LED7 to LED10, LED12 to LED15, LED17 to LED20, LED22 to LED25, LED27 to LED30, LED32 to LED35, LED37 to LED40.

Each light-emitting diode LED2 to LED5, LED7 to LED10, LED12 to LED15, LED17 to LED20, LED22 to LED25, LED27 to LED30, LED32 to LED35, LED37 to LED40 has an anode as the first connection and a cathode as the second connection.

The first connection of each light-emitting diode is connected to the first supply connection Vcc via one of eight first switches Q1 to Q8. A first connection of each first switch Q1 to Q8 is connected to said first supply connection Vcc, while a second connection of the first switches Q1 to Q8 is connected to the first connections of four of the light-emitting diodes.

Via one of four second switches Q10 to Q13, the second connection of each light-emitting diode is connected to the second supply connection GND. A second connection of each second switch Q10 to Q13 is connected to said second supply connection GND, while a first connection of the second switches Q10 to Q13 is connected to the second connections of eight of the light-emitting diodes.

All light-emitting diodes which are connected to the second connection of the same first switch Q1 to Q8 via the respective first connection are connected via the respective second connections of said first connections of different second switches Q10 to Q13. Likewise, all light-emitting diodes which are connected to the first connection of the same second switches Q10 to Q13 via the respective second connection are connected via the respective first connections of said second connections of different first switches Q1 to Q8. The light-emitting diodes are therefore neither connected in parallel nor in series.

The first switches Q1 to Q8 as well as the second switches Q10 to Q13, which are transistors, have control connections via which they are connected to a controller, not shown. By programming the controller, it is possible to close and open switches Q1 to Q8, Q10 to Q13 in a desired way to produce light.

With the controller, not shown, it is possible to drive the first switches Q1 to Q8 and the second switches Q10 to Q13 to close and open in such a way that none, one or more LEDs connected to one of said second switches Q10 to Q13 are supplied with power from the controllable power source. Whether none, only one or more LEDs are supplied with power depends on whether none, only one or more first switches Q1 to Q8 are driven to close. If only a first switch is driven to close, the amount of the current can be individually adjusted by controlling the controllable power source.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A lighting unit comprising:

a controllable power source for a headlight; and a light-emitting diode matrix comprising:

at least one first supply connection;

a number m of first switches which have a first connection that is connected to the first supply connection;

at least one second supply connection;

a number n of second switches which have a second connection that is connected to the second supply connection;

a number of m*n inorganic light-emitting diodes, a first connection of which is connected to a second connection of one of the first switches and a second connection of which is connected to a first connection of one of the second switches, wherein each second connection of a first switch is connected to a number n of the light-emitting diodes, wherein each first connection of a second switch is connected to a number m of the light-emitting diodes, wherein the light-emitting diodes which are connected to the second connection of the same first switch via the respective first connection of said light-emitting diodes are connected to the first connections of different switches of the second switches via the respective second connections of said light-emitting diodes, and wherein the light-emitting diodes which are connected to the first connection of the same second switch via the respective second connection of said light-emitting diodes are connected to the second connections of different switches of the first switches via the respective first connections of said light-emitting diode, and wherein the controllable power source is connected to the first supply connection and the second supply connection.

2. The lighting unit according to claim 1, wherein the light-emitting diodes are the same.

3. The lighting unit according to claim 1, wherein the first connection of the light-emitting diodes is an anode and the second connection of the light-emitting diodes is a cathode.

4. The lighting unit according to claim 1, wherein the first connection of the light-emitting diodes is a cathode and the second connection of the light-emitting diode is an anode.

5. The lighting unit according to claim 1, wherein the lighting unit includes a controller with which the first switches and the second switches of the light-emitting diode matrix are controllable, and wherein the controller is set up such that none, one or more of the first switches and in each case one of the second switches is closed during one of m*n consecutive sections of a period.

6. The lighting unit according to claim 5, wherein the controller is set up such that the sections of the period are of different lengths.

7. The lighting unit according to claim 5, wherein the controller is set up such that the length of the sections are changeable from period to period.

8. The lighting unit according to claim 5, wherein the controller is connected to a control connection of the controllable power source and that the controller is set up such that the current strength of the current supplied by the power source is adjustable for each section of the period.

9. A method for operating a lighting unit according to claim 5, wherein the controller controls the first switches and the second switches such that during one of the m*n sections of the period m*n none or at least one respective first switch and one respective second switch are closed.

10. The method according to claim 9, wherein the controller specifies a target current strength for each of the m*n sections and controls the power source in such a way that the target current strength of the power source is set for each of the m*n sections.

* * * * *